US012712096B2

(12) United States Patent
Tung et al.

(10) Patent No.: US 12,712,096 B2
(45) Date of Patent: Aug. 18, 2026

(54) COMPOSITE CONDUCTIVE STRUCTURE AND MAGNETIC COMPONENT

(71) Applicant: DELTA ELECTRONICS, INC., Taoyuan City (TW)

(72) Inventors: Huai-Pei Tung, Taoyuan City (TW); Chun-Ching Yen, Taoyuan City (TW); Shao-Dong Zhang, Taoyuan City (TW)

(73) Assignee: DELTA ELECTRONICS, INC., Taoyuan City (TW)

( * ) Notice: Subject to any disclaimer, the term of this patent is extended or adjusted under 35 U.S.C. 154(b) by 232 days.

(21) Appl. No.: 18/176,498

(22) Filed: Mar. 1, 2023

(65) Prior Publication Data

US 2024/0096519 A1 Mar. 21, 2024

(30) Foreign Application Priority Data

Sep. 20, 2022 (CN) ......................... 202211142295.7

(51) Int. Cl.
*H01B 1/02* (2006.01)
*H01B 7/00* (2006.01)

(52) U.S. Cl.
CPC ........... *H01B 7/0018* (2013.01); *H01B 1/026* (2013.01)

(58) Field of Classification Search
CPC . H01B 1/02; H01B 1/026; H01B 3/30; H01B 3/307; H01B 7/0018; H01B 7/02; H01B 7/18; H01B 11/18; H01B 11/20; H01B 11/183; H01F 27/26; H01F 27/28; H01F 27/30; H01F 27/32
USPC ................ 174/36, 102 SC, 105 SC, 106 SC, 174/120 SC, 115, 107, 117 F, 117 FF, 174/126.1, 126.2; 307/106, 107, 108, 307/109, 110, 412, 413, 414, 415, 416, 307/417, 418
See application file for complete search history.

(56) References Cited

U.S. PATENT DOCUMENTS 1,972,319 A * 9/1934 Rypinski ................... H01F 5/00 335/282
4,851,060 A * 7/1989 Wade, Jr. .............. H01F 41/122 428/378
5,012,125 A * 4/1991 Conway .................. H01F 27/34 336/229
5,579,202 A * 11/1996 Tolfsen ................... H01F 19/08 361/232
9,691,518 B2 6/2017 Huang et al.
9,691,524 B2 * 6/2017 Hobson ................ H01B 7/2825
9,892,820 B2 * 2/2018 Kodama ................ H01B 11/20
2002/0003046 A1 * 1/2002 Clouet ................. H01B 11/183 174/108
2009/0250109 A1 * 10/2009 Hasegawa ............ C08K 5/1515 428/473.5

(Continued)

FOREIGN PATENT DOCUMENTS

CN 102570160 A 7/2012
CN 202839029 U 3/2013

(Continued)

*Primary Examiner* — William H. Mayo, III
(74) *Attorney, Agent, or Firm* — CKC & Partners Co., LLC

(57) ABSTRACT

A composite conductive structure includes plural enameled wires and a copper foil. The enameled wires are immediately adjacent to each other and extend in the same direction. The copper foil surrounds the outside of the enameled wires at least once, and completely covers the entire outside of the enameled wires.

13 Claims, 6 Drawing Sheets

(56) References Cited

U.S. PATENT DOCUMENTS

| | | | | |
|---|---|---|---|---|
| 2010/0116541 | A1 * | 5/2010 | Eshima | H01B 7/1865 174/388 |
| 2016/0358689 | A1 * | 12/2016 | Huang | A61B 1/00114 |

FOREIGN PATENT DOCUMENTS

| | | | | | |
|---|---|---|---|---|---|
| CN | 103842568 | A | | 6/2014 | |
| CN | 104795201 | A | | 7/2015 | |
| CN | 205264395 | U | * | 5/2016 | H01B 7/17 |
| CN | 205487685 | U | | 8/2016 | |
| CN | 209312569 | U | * | 8/2019 | H01F 27/23 |
| CN | 209433905 | U | | 9/2019 | |
| CN | 110853895 | A | | 2/2020 | |
| JP | 2005149963 | A | | 6/2005 | |
| SK | 2262017 | U1 | * | 9/2018 | H01F 30/16 |
| TW | M305419 | U | | 1/2007 | |

* cited by examiner

COMPOSITE CONDUCTIVE STRUCTURE AND MAGNETIC COMPONENT

CROSS-REFERENCE TO RELATED APPLICATIONS

This application claims priority to China Application Serial Number 202211142295.7, filed Sep. 20, 2022, which is herein incorporated by reference.

BACKGROUND

Field of Invention

The present disclosure relates to a composite conductive structure and a magnetic component having the composite conductive structure.

Description of Related Art

In the transformer of a switching power supply, in order to improve overall efficiency, a copper filling rate in the transformer must be increased to reduce a copper loss under the application of high output current. Generally, for example, a copper sheet or a single-core thick wire may be used to wrap around an iron core. However, since the current at the output has both alternating current and direct current, the skin depth and proximity effect cause AC loss on the copper sheet or the single-core thick wire, and this phenomenon becomes more serious with the increase of power density and the increase of frequency. Although the use of a multi-strand wire can effectively suppress the AC loss caused by skin depth and proximity effect, the multi-strand wire has a lower copper filling rate than the copper sheet or the single-core wire. Therefore, under high wattage applications, DC loss increases as current increases. If the number of the strands of the multi-strand wire is increased to enlarge the cross-sectional area of copper, the volume of the multi-strand wire will be increased.

In addition, the multi-strand wire is the combination of multiple single-core wires, and two ends of the multi-strand wire are difficult to shape after tin is used to cover the two ends of the multi-strand wire, such as the formations of tin cracks, burrs, tin whiskers, etc., which require post-processing shaping treatments (e.g., bevel cutting, molding, etc.) to facilitate subsequent automatic plug-ins, thereby increasing manufacturing cost.

SUMMARY

One aspect of the present disclosure provides a composite conductive structure.

According to some embodiments of the present disclosure, a composite conductive structure includes plural enameled wires and a copper foil. The enameled wires are immediately adjacent to each other and extend in the same direction. The copper foil surrounds the outside of the enameled wires at least once, and completely covers the entire outside of the enameled wires.

In some embodiments, the copper foil rolls around the enameled wires, and an included angle between a tangent direction of the copper foil rolling around the enameled wires and a lengthwise direction of the enameled wires is 90 degrees.

In some embodiments, a length of the copper foil is the same as a length of the enameled wires.

In some embodiments, the outside of the enameled wires defines a circumference, and a width of the copper foil is greater than or equal to the circumference.

In some embodiments, the copper foil wraps around the enameled wires, and an included angle between a tangent direction of the copper foil wrapping around the enameled wires and a lengthwise direction of the enameled wires is in a range from 30 degrees to 60 degrees.

In some embodiments, a length of the copper foil is greater than a length of the enameled wires.

In some embodiments, the copper foil has a plurality of overlapping regions, and the overlapping regions are located on the outside of the enameled wires and spaced from each other.

In some embodiments, a width of each of the overlapping regions is less than a width of the copper foil.

In some embodiments, a thickness of the copper foil is in a range from 0.0005 inches to 0.005 inches.

In some embodiments, the composite conductive structure further includes an adhesive. The adhesive is located between the copper foil and the outside of the enameled wires.

In some embodiments, the adhesive is conductive glue.

In some embodiments, the composite conductive structure further includes a conductive material. The conductive material covers an end of the copper foil and ends of the enameled wires at a same side.

In some embodiments, the conductive material is tin, and the conductive material has a round outline.

Another aspect of the present disclosure provides a magnetic component.

According to some embodiments of the present disclosure, a magnetic component includes a core and a composite conductive structure wrapping around a portion of the core. The composite conductive structure includes a plurality of enameled wires and a copper foil. The enameled wires are immediately adjacent to each other and extend in a same direction. The copper foil surrounds an outside of the enameled wires at least once, and completely covers the entire outside of the enameled wires.

In some embodiments, an end of the composite conductive structure extends outward from the core, and the composite conductive structure further includes a conductive material covering said end of the composite conductive structure.

In the aforementioned embodiments of the present disclosure, since the composite conductive structure includes the enameled wires that are adjacent to each other and extend in the same direction, AC loss caused by skin depth and proximity effect can be effectively suppressed. Moreover, because the copper foil surrounds the outside of the enameled wires at least once and completely covers the entire outside of the enameled wires, the inner copper filling rate of the composite conductive structure can be increased to reduce DC loss under high wattage applications. In addition, since the copper foil has an advantage of shaping the enameled wires, it can not only ensure that the enameled wires are close to each other to save volume, but also further omit or simplify post-processing and shaping treatments at the same side of traditional enameled wires (such as bevel cutting process and molding process after tinning). As a result, manufacturing cost can be reduced.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
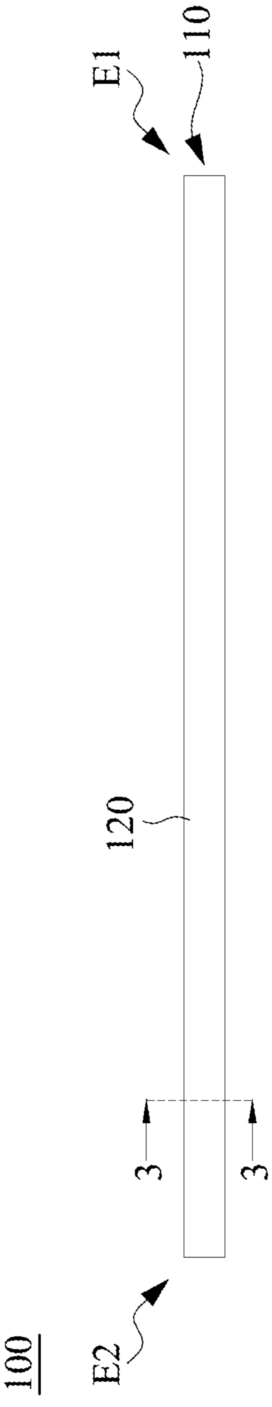
FIG. 1 is a side view of a composite conductive structure according to one embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 2:
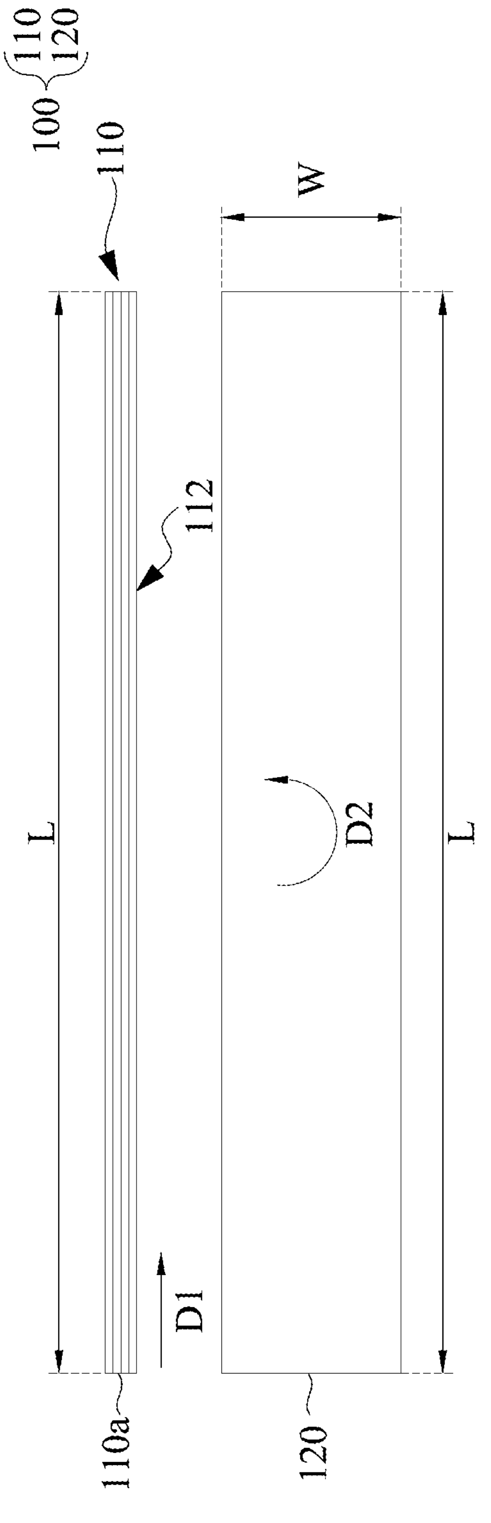
FIG. 2 is an exploded view of the composite conductive structure of FIG. 1 before a copper foil rolls around enameled wires.

FIG. 1 is a side view of a composite conductive structure 100 according to one embodiment of the present disclosure. FIG. 2 is an exploded view of the composite conductive structure 100 of FIG. 1 before a copper foil 120 rolls around a bunch of enameled wires 110. As shown in FIG. 1 and FIG. 2, the composite conductive structure 100 includes plural enameled wires 110*a* and the copper foil 120. The enameled wires 110*a* are immediately adjacent to each other and extend in the same direction D1, thereby forming a bunch of enameled wires 110. The present disclosure is not limited to the number of the enameled wires 110*a*. In this embodiment, the copper foil 120 rolls around the bunch of enameled wires 110, such that the copper foil 120 surrounds the outside 112 of the bunch of enameled wires 110 at least once, and completely covers the entire outside 112 of the enameled wires 110*a*. The peripheral of each of the enameled wires 110*a* may have insulating paint so as to insulate from each other, and the enameled wires 110*a* may be applied to a transformer. In this description, "roll around" is referred to as the forming method of a paper roll, an egg roll, or a sushi roll.

Figure 3:
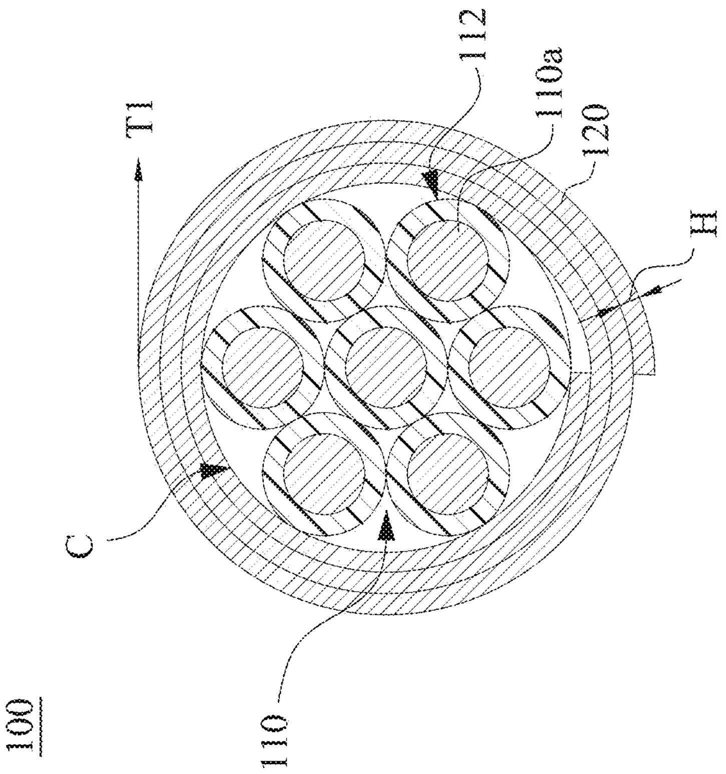
FIG. 3 is a cross-sectional view of the composite conductive structure of FIG. 1 taken along line 3-3.

FIG. 3 is a cross-sectional view of the composite conductive structure 100 of FIG. 1 taken along line 3-3. As shown in FIG. 2 and FIG. 3, when the copper foil 120 rolls around the bunch of enameled wires 110, and an included angle between a tangent direction T1 of the copper foil 120 rolling around the bunch of enameled wires 110 and a lengthwise direction (i.e., a direction D1) of the bunch of enameled wires 110 is 90 degrees. It is to be noted that the direction D1 of FIG. 2 is the direction that is perpendicular to the paper of FIG. 3. In other words, the bunch of enameled wires 110 is perpendicular to the aforementioned tangent direction T1. As a result of such a configuration, the composite conductive structure 100 used under high current (including DC and AC) applications can effectively reduce loss to achieve the need for increasing efficiency and increasing power density.

Specifically, since the composite conductive structure 100 includes the enameled wires 110*a* that are adjacent to each other and extend in the same direction D1, AC loss caused by skin depth and proximity effect can be effectively suppressed. Moreover, because the copper foil 120 of the composite conductive structure 100 surrounds the outside 112 of the bunch of enameled wires 110 at least once and completely covers the entire outside 112 of the enameled wires 110*a*, the inner copper filling rate of the composite conductive structure 100 can be increased to reduce DC loss under high wattage applications. In addition, since the copper foil 120 has an advantage of shaping the bunch of enameled wires 110, it can not only ensure that the enameled wires 110*a* are close to each other to save volume, but also further omit or simplify post-processing and shaping treatments at the end of traditional enameled wires (such as bevel cutting process and molding process after tinning). As a result, manufacturing cost can be reduced.

In this embodiment, the length of the copper foil 120 is the same as the length of the bunch of enameled wires 110, and both are a length L, thereby ensuring that the copper foil 120 can completely covers the entire outside 112 of the bunch of enameled wires 110 through rolling around. Furthermore, the outside 112 of the bunch of enameled wires 110 may be arranged to form a round outline, and thus the outside 112 of the bunch of enameled wires 110 may define a circumference C. In detail, the outside 112 of the bunch of enameled wires 110 adjacent to the copper foil 120 may surround to form a continuous surface, while the continuous surface is the aforementioned circumference C. In this embodiment, a width W of the copper foil 120 is greater than or equal to the circumference C of the bunch of enameled wires 110, thereby ensuring that the copper foil 120 can surround the outside 112 of the bunch of enameled wires 110 more than once. For example, the copper foil 120 of FIG. 3 surrounds the outside 112 of the bunch of enameled wires 110 three times, but the present disclosure is not limited in this regard. In some embodiment, the width W of the copper foil 120 may be in a range from 15 mm to 25 mm, such as 21 mm. A thickness H of the copper foil 120 may be in a range from 0.0005 inches to 0.005 inches, such as 0.001 inches.

Figure 4:
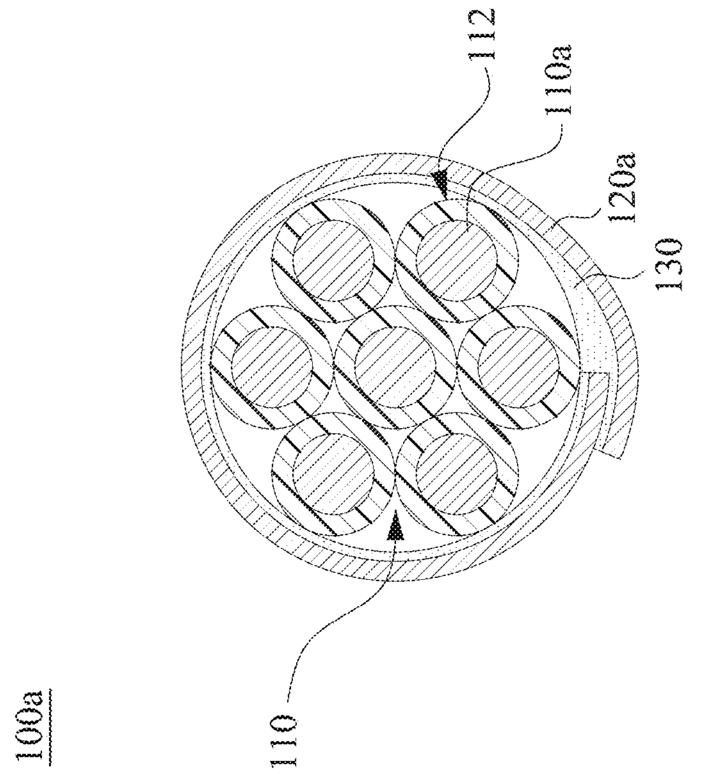
FIG. 4 is a cross-sectional view of a composite conductive structure according to another embodiment of the present disclosure.

FIG. 4 is a cross-sectional view of a composite conductive structure 100*a* according to another embodiment of the present disclosure, in which the cross-sectional position of FIG. 4 is the same as that of FIG. 3. The composite conductive structure 100*a* includes the plural enameled wires 110*a* and a copper foil 120*a* that surrounds the outside 112 of the bunch of enameled wires 110. The difference between this embodiment and the embodiment of FIG. 3 is that the composite conductive structure 100*a* further includes an adhesive 130. The adhesive 130 is located between the copper foil 120*a* and the outside 112 of the bunch of enameled wires 110. In some embodiments, the adhesive 130 is conductive glue, such as silver glue or copper glue. The adhesive 130 may be pre-formed on the surface of the copper foil 120*a* facing the bunch of enameled wires 110. Therefore, when the copper foil 120*a* surrounds the bunch of enameled wires 110, the copper foil 120*a* can be directly attached to the outside 112 of the bunch of enameled wires 110, which is convenient for use. Since the composite conductive structure 100*a* has the adhesive 130, the compactness (closeness) between the copper foil 120*a* and the bunch of enameled wires 110 can be improved, thereby decreasing the volume of the composite conductive structure 100*a*. Moreover, the adhesive 130 between the copper foil 120*a* and the bunch of enameled wires 110 has conductivity, and thus the impedance can be further reduced, which is beneficial to current transmission. In this embodiment, the copper foil 120*a* surrounds the outside 112 of the bunch of enameled wires 110 once, but the present disclosure is not limited in this regard.

It is to be noted that the connection relationships, the materials, and the advantages of the elements described above will not be repeated in the following description. In the following description, other types of composite conductive structures will be explained.

Figures 5, 6:
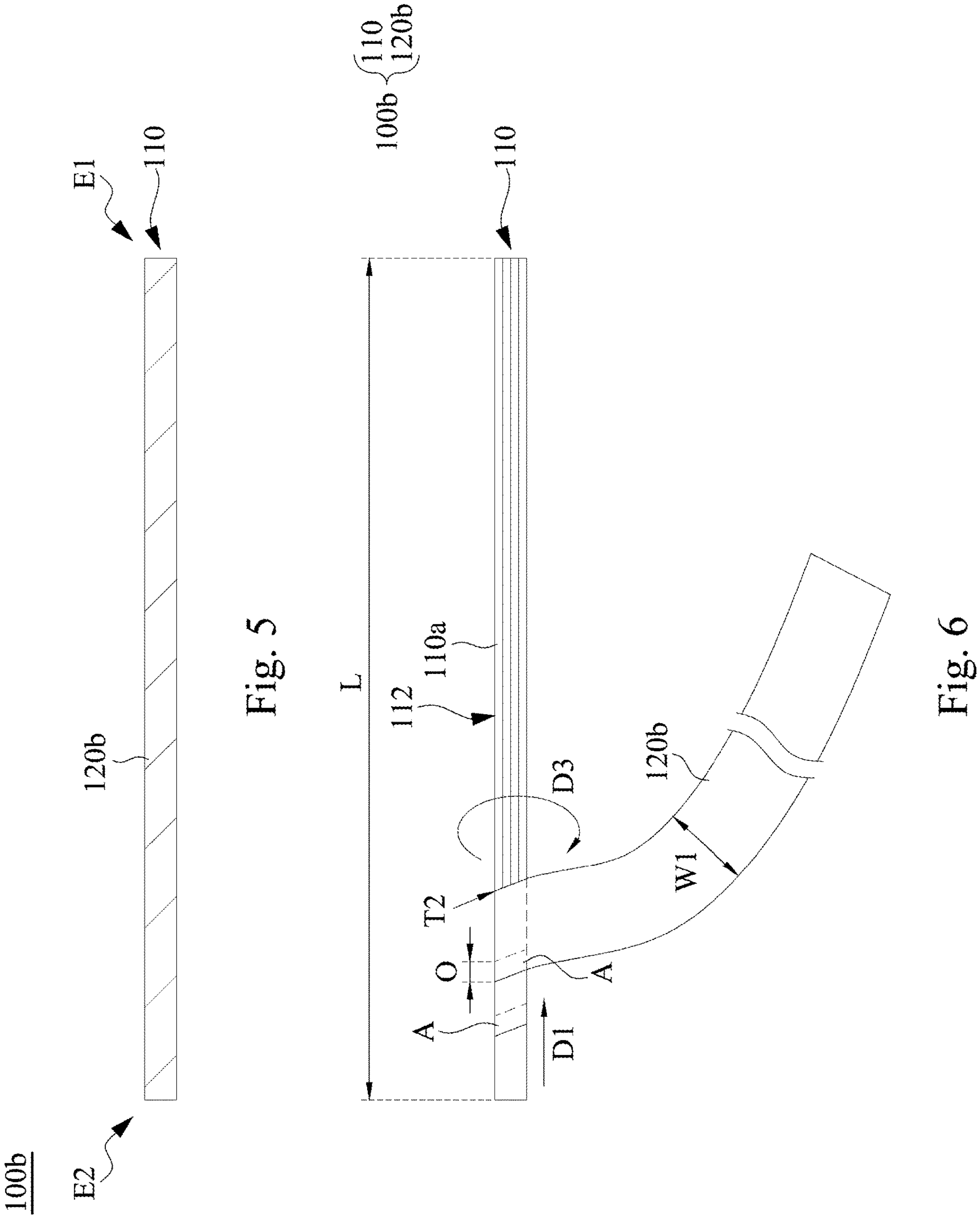
FIG. 5 is a side view of a composite conductive structure according to still another embodiment of the present disclosure.
FIG. 6 is a side view of the composite conductive structure of FIG. 5 when the copper foil wraps around the enameled wires.

FIG. 5 is a side view of a composite conductive structure 100*b* according to still another embodiment of the present disclosure. FIG. 6 is a side view of the composite conductive structure 100*b* of FIG. 5 when a copper foil 120*b* wraps around the bunch of enameled wires 110. As shown in FIG. 5 and FIG. 6, the composite conductive structure 100*b* includes the bunch of enameled wires 110 and the copper foil 120*b*. The enameled wires 110*a* are immediately adjacent to each other and extend in the same direction D1, thereby forming the bunch of enameled wires 110. In this embodiment, the copper foil 120*b* wraps around the bunch of enameled wires 110, such that the copper foil 120*b* may surround the outside 112 of the bunch of enameled wires 110 at least once, and completely covers the entire outside 112 of the bunch of enameled wires 110. In this description, “wrap around” is referred to as the way a bandage is placed around the leg.

In this embodiment, when the copper foil 120*b* wraps around the bunch of enameled wires 110, an included angle between a tangent direction T2 of the copper foil 120*b* wrapping around the bunch of enameled wires 110 and the lengthwise direction (i.e., the direction D1) of the bunch of enameled wires 110 is in a range from 30 degrees to 60 degrees, such as 45 degrees. In addition, the copper foil 120*b* has a plurality of overlapping regions A, and the overlapping regions A are located on the outside 112 of the bunch of enameled wires 110 and are spaced from each other. A width O of each of the overlapping regions A is less than a width W1 of the copper foil 120*b*, which not only can prevent any portion of the outside 112 of the bunch of enameled wires 110 from being exposed, but also can enable the copper foil 120*b* to wrap around the bunch of enameled wires 110 from one end to another end in the direction D1. In other words, the copper foil 120*b* wraps around the outside 112 of the bunch of enameled wires 110 by obliquely and partially overlapping. The composite conductive structure 100*b* used under high current (including DC and AC) applications can effectively reduce loss to achieve the need for increasing efficiency and increasing power density.

Figure 7:
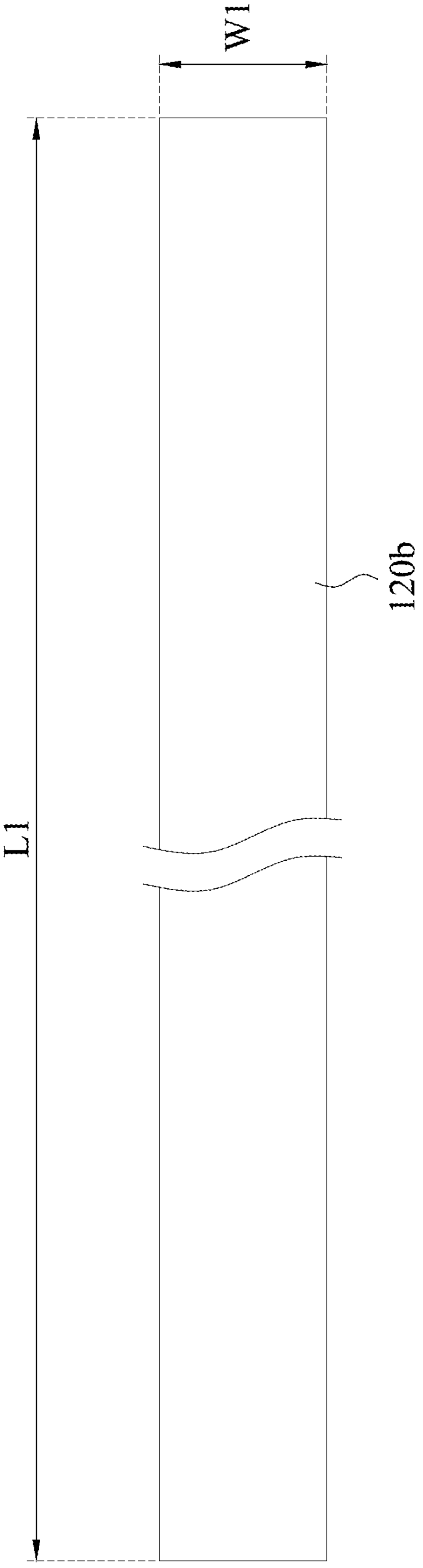
FIG. 7 is a side view of the copper foil of FIG. 5 when being straightened.

FIG. 7 is a side view of the copper foil 120*b* of FIG. 5 when being straightened. As shown in FIG. 6 and FIG. 7, in this embodiment, since the copper foil 120*b* is disposed on the outside 112 of the bunch of enameled wires 110 by wrapping and has the overlapping region A, a length L1 of the copper foil 120*b* is greater than the length L of the bunch of enameled wires 110 when the copper foil 120*b* does not wrap around the bunch of enameled wires 110 yet (i.e., when the copper foil 120*b* is straightened).

Figure 8:
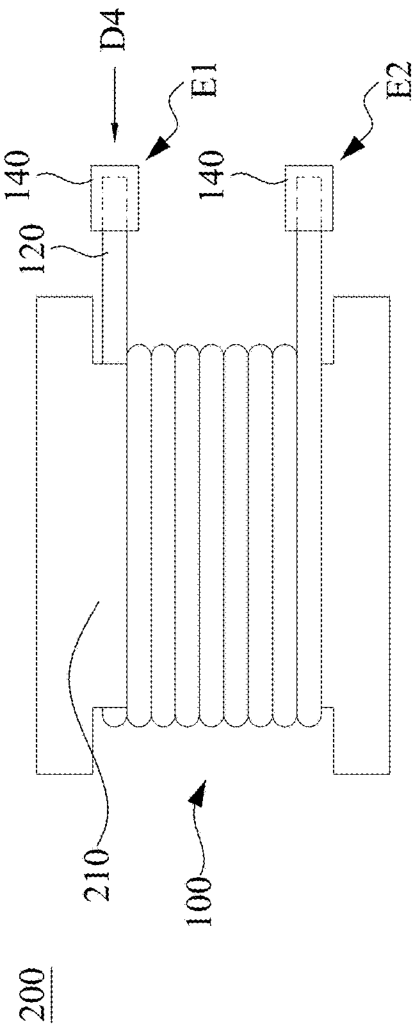
FIG. 8 is a side view of a magnetic component according to one embodiment of the present disclosure.

FIG. 8 is a side view of a magnetic component 200 according to one embodiment of the present disclosure. As shown in FIG. 8, the magnetic component 200 includes an iron core 210 and the aforementioned composite conductive structure 100. The composite conductive structure 100 wraps around a portion of the iron core 210, and two ends E1 and E2 of the composite conductive structure 100 may extend outward from the iron core 210. The magnetic component 200 may be an AC and DC transformer, but the present disclosure is not limited in this regard. The magnetic component 200 may alternatively be an AC transformer or a DC transformer. In other embodiments, the composite conductive structure 100 of FIG. 8 may be replaced with the aforementioned composite conductive structure 100*a* (see FIG. 4) or 100*b* (see FIG. 5).

Figure 9:
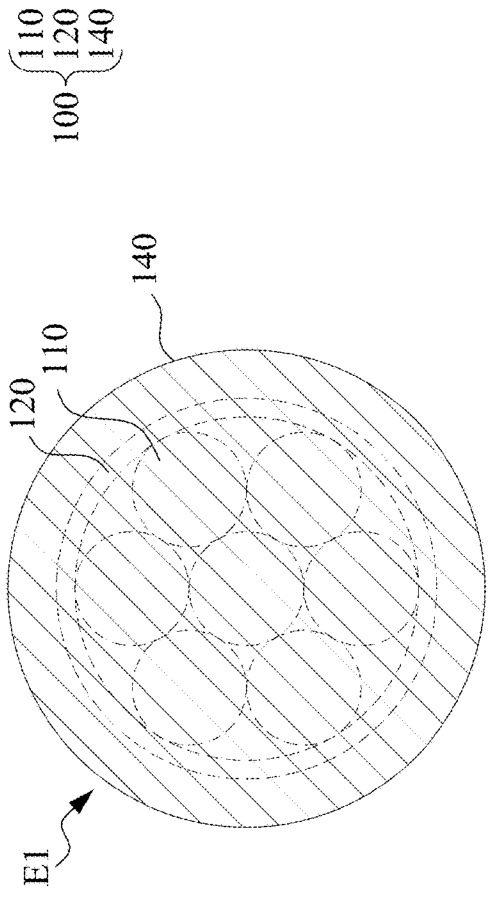
FIG. 9 is schematic view of a conductive material of FIG. 8 when viewed in a direction D4.

FIG. 9 is schematic view of a conductive material 140 of FIG. 8 when viewed in a direction D4. FIG. 9 merely presents the end E1 of the composite conductive structure 100 as an example. It is to be noted that the other end E2 of the composite conductive structure 100 of FIG. 8 may have the same structure as FIG. 9. As shown in FIG. 8 and FIG. 9, the composite conductive structure 100 further includes a conductive material 140. The conductive material 140 covers the two ends E1 and E2 of the composite conductive structure 100. That is, the conductive material 140 covers an end of the copper foil 120 and an end of the bunch of enameled wires 110 at the same side. In other words, the conductive material 140 covers two ends of the copper foil 120 and two ends of the bunch of enameled wires 110. In some embodiments, the conductive material 140 is tin, and the conductive material 140 has a round outline.

Since the same-side end of the traditional multi-strand wire used as conductive pins is prone to tin cracks, burrs, and tin whiskers after a tinning process and a pin cutting process, it is necessary for the subsequent automation plug-in to perform the shaping action (e.g., molding, bevel cutting, etc.) of the conductive pins at the same side of the multi-strand wire to facilitate plug-in. However, in this embodiment, the bunch of enameled wires 110 of the composite conductive structure 100 has been preliminarily shaped by the copper foil 120, so that the outline of the composite conductive structure 100 has a quasi-circular shape already before the conductive material 140 is attached. As a result, the plug-in machine can effectively identify the center point of the composite conductive structure 100, and the accuracy of automatic plug-in is improved. In addition, the copper foil 120 surrounding the bunch of enameled wires 110 can avoid the occurrence of tin cracks, burrs, tin whiskers, etc. on the conductive material 140 after the formation of the conductive material 140, so post-processing shaping treatments (e.g., bevel cutting, molding, etc. after tinning) traditionally performed on the same-side ends of the enameled wires 110*a* (see FIG. 2 and FIG. 6) can be omitted or simplified to reduce manufacturing cost.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A composite conductive structure, comprising:

a plurality of enameled wires immediately adjacent to each other and extending in a same direction, wherein the enameled wires have first ends and second ends, and an outside of the enameled wires defines a circumference;

a copper foil completely surrounding the enameled wires along the entire circumference at least once, and completely covering the entire outside of the enameled wires, wherein the copper foil has a first end and a second end;

a first conductive material covering the first end of the copper foil and the first ends of the enameled wires at a same side; and a second conductive material covering the second end of the copper foil and the second ends of the enameled wires at another same side, wherein the first conductive material and the second conductive material are in electrical and direct contact with the copper foil and conductors of the enameled wires to form a unified conductive termination electrically integrating all the enameled wires and the copper foil, and portions of the copper foil not covered by the first conductive material and the second conductive material are exposed.

2. The composite conductive structure of claim 1, wherein the copper foil rolls around the enameled wires, and an included angle between a tangent direction of the copper foil rolling around the enameled wires and a lengthwise direction of the enameled wires is 90 degrees.

3. The composite conductive structure of claim 2, wherein a length of the copper foil is the same as a length of the enameled wires.

4. The composite conductive structure of claim 3, wherein a width of the copper foil is greater than or equal to the circumference.

5. The composite conductive structure of claim 1, wherein the copper foil wraps around the enameled wires, and an included angle between a tangent direction of the copper foil wrapping around the enameled wires and a lengthwise direction of the enameled wires is in a range from 30 degrees to 60 degrees.

6. The composite conductive structure of claim 5, wherein a length of the copper foil is greater than a length of the enameled wires.

7. The composite conductive structure of claim 6, wherein the copper foil has a plurality of overlapping regions, and the overlapping regions are located on the outside of the enameled wires and spaced from each other.

8. The composite conductive structure of claim 7, wherein a width of each of the overlapping regions is less than a width of the copper foil.

9. The composite conductive structure of claim 1, wherein a thickness of the copper foil is in a range from 0.0005 inches to 0.005 inches.

10. The composite conductive structure of claim 1, further comprising:

an adhesive located between the copper foil and the outside of the enameled wires.

11. The composite conductive structure of claim 10, wherein the adhesive is conductive glue.

12. The composite conductive structure of claim 1, wherein each of the first conductive material and the second conductive material is tin, and has a round outline.

13. A magnetic component, comprising:

a core; and a composite conductive structure wrapping around a portion of the core and comprising:

a plurality of enameled wires immediately adjacent to each other and extending in a same direction, wherein the enameled wires have first ends and second ends, and an outside of the enameled wires defines a circumference;

a copper foil completely surrounding the enameled wires along the entire circumference at least once, and completely covering the entire outside of the enameled wires, wherein the copper foil has a first end and a second end;

a first conductive material covering the first end of the copper foil and the first ends of the enameled wires at a same side; and a second conductive material covering the second end of the copper foil and the second ends of the enameled wires at another same side, wherein the first conductive material and the second conductive material are in electrical and direct contact with the copper foil and conductors of the enameled wires to form a unified conductive termination electrically integrating all the enameled wires and the copper foil, and portions of the copper foil not covered by the first conductive material and the second conductive material are exposed.

* * * * *